United States Patent [19]

Veillette et al.

[11] Patent Number: 4,659,063

[45] Date of Patent: Apr. 21, 1987

[54] AUTOMATIC FLOOD CONTROL VALVE

[76] Inventors: Gaston Veillette, 3977 St.Malo; Claude Giroux, 2891 Rg. St.Malo, both of Ste-Marthe,du Cap, PQ, Canada, G8T 7V7

[21] Appl. No.: 854,935

[22] Filed: Apr. 23, 1986

[51] Int. Cl.[4] .......... F16K 31/44

[52] U.S. Cl. .......... 251/68; 251/74

[58] Field of Search .......... 251/68, 74, 116, 251, 251/263

[56] References Cited

U.S. PATENT DOCUMENTS

| | | | |
|---|---|---|---|
| 896,402 | 8/1908 | Locke | 251/68 X |
| 2,333,370 | 11/1943 | Graham | 251/68 X |
| 2,875,617 | 3/1959 | Murphy | 251/68 X |
| 3,030,063 | 4/1962 | Seaberg et al. | 251/74 |
| 3,797,804 | 3/1974 | Ashbaugh | 251/68 |
| 4,004,601 | 1/1977 | Bachelder et al. | 251/74 X |
| 4,379,544 | 4/1983 | Angelo et al. | 251/74 |

*Primary Examiner*—Alan Cohan
*Assistant Examiner*—John A. Rivell
*Attorney, Agent, or Firm*—Swabey, Mitchell, Houle, Marcoux & Sher

[57] ABSTRACT

An automatic shut off valve for shutting off the water supply to a building in the case of a detected water leak. A conventional valve is provided with an apparatus for rendering the valve automatic when the valve has a sliding stem projecting from the valve body. The apparatus includes a jacket adapted to fit over the valve body to contain the stem having a roof normal to the axis of the stem and spaced from the end thereof and a plunger slidably mounted through the roof extending coaxial with and connected to the stem. A compression spring extends between the roof and the plunger to urge the valve stem to retract to close the valve. A lever member is pivotally mounted to the plunger and extends exteriorly of the jacket. The lever member includes a cam head abutting the roof between plunger extended and retracted positions. A retaining member is pivotally mounted to the exterior of the jacket and a pair of arms extends outwardly therefrom with one arm of the retaining member engaging a first lever arm on the lever member to retain in a plunger extended position. The retaining member has a third arm extending in the direction opposite to the second arm and is connected to a solenoid device which can be actuated to pivot the retaining member to disengage the second arm of the retaining means from the lever arm allowing the plunger to retract the valve stem and close the valve.

5 Claims, 2 Drawing Figures

AUTOMATIC FLOOD CONTROL VALVE

BACKGROUND OF THE INVENTION

1. Field of the Invention

The present invention relates to an automatic flood control valve apparatus and more particularly to an improved mechanism for closing a normally open valve in a water supply system.

2. Description of the Prior Art

There are many systems for automatically controlling a valve to interrupt the water supply in the event that flooding occurs due to a leak somewhere in a water system. For instance, U.S. Pat. Nos. 4,324,268, Jacobson, Apr. 13, 1982; 4,305,420, Nussdorf, Dec. 15, 1981; U.S. Pat. No. 3,874,403, Fisher, Apr. 1, 1975, all show a normally opened valve provided in a water system. Sensors for detecting a leak are linked to an electrical circuit for operating a solenoid for moving a plunger which operates the valve to close it. The valve must be manually reset in order to reopen the valve.

SUMMARY OF THE INVENTION

It is an aim of the present invention to provide an adapter kit for rendering a conventional valve operational as an automatic shut off valve.

It is a further aim of the present invention to provide an improved an inexpensive automatic shut off valve.

A construction in accordance with the present invention comprises an apparatus for rendering as an automatic shut off valve, a valve with a sliding stem projecting from a valve body, the apparatus including a jacket adapted to fit over said valve body and to contain the stem. The jacket includes a portion extending axially of and containing the stem and having a roof wall normal to the axis of the stem and spaced from the end thereof. The jacket includes a plunger slidably mounted to the roof wall and extending therethrough co-axial with the valve stem and adapted to be connected thereto. A compression spring extends between the roof wall and is connected to the plunger within the jacket portion to urge the valve stem to retract within the valve body to close the valve. The plunger pivotally mounts a lever member exteriorly of the jacket. The lever member includes a cam head abutting on the roof wall between a plunger extended position and a plunger retracted position. The lever member includes a first lever arm extending radially from the pivot point of the lever member and the plunger. A retaining member is pivotally mounted to the exterior of the jacket and a first arm extends from the pivot point. A second arm extends therefrom at an acute angle to the first arm and is adapted to engage the first lever arm to retain the lever member in a plunger extended position against the urging of the compression spring. The retaining member has a third arm extending in a direction opposite to the second arm and is connected to a solenoid means whereby the retaining member may be pivoted to disengage the second arm of the retaining means from the first lever arm to allow the plunger to retract the valve stem and thus close the valve.

In a more specific embodiment, the lever member includes a second lever arm extending at an acute angle relative to the first lever arm for manually resetting the valve in a valve open position.

One of the advantages of the present invention is that the jacket can be mounted to most conventional shut off valves. It is merely necessary to replace the normally threaded valve stem and threaded valve collar by a sliding stem and collar. The compression is located at the exterior of the valve body and therefore is not in contact with the fluid passing through the pipes. The shut off assembly can be supplied, therefore, as a kit to adapt existing systems.

BRIEF DESCRIPTION OF THE DRAWINGS

Having thus generally described the nature of the invention, reference will now be made to the accompanying drawings showing by way of illustration, a preferred embodiment thereof, and in which.

DESCRIPTION OF THE PREFERRED EMBODIMENTS

Figure 1:
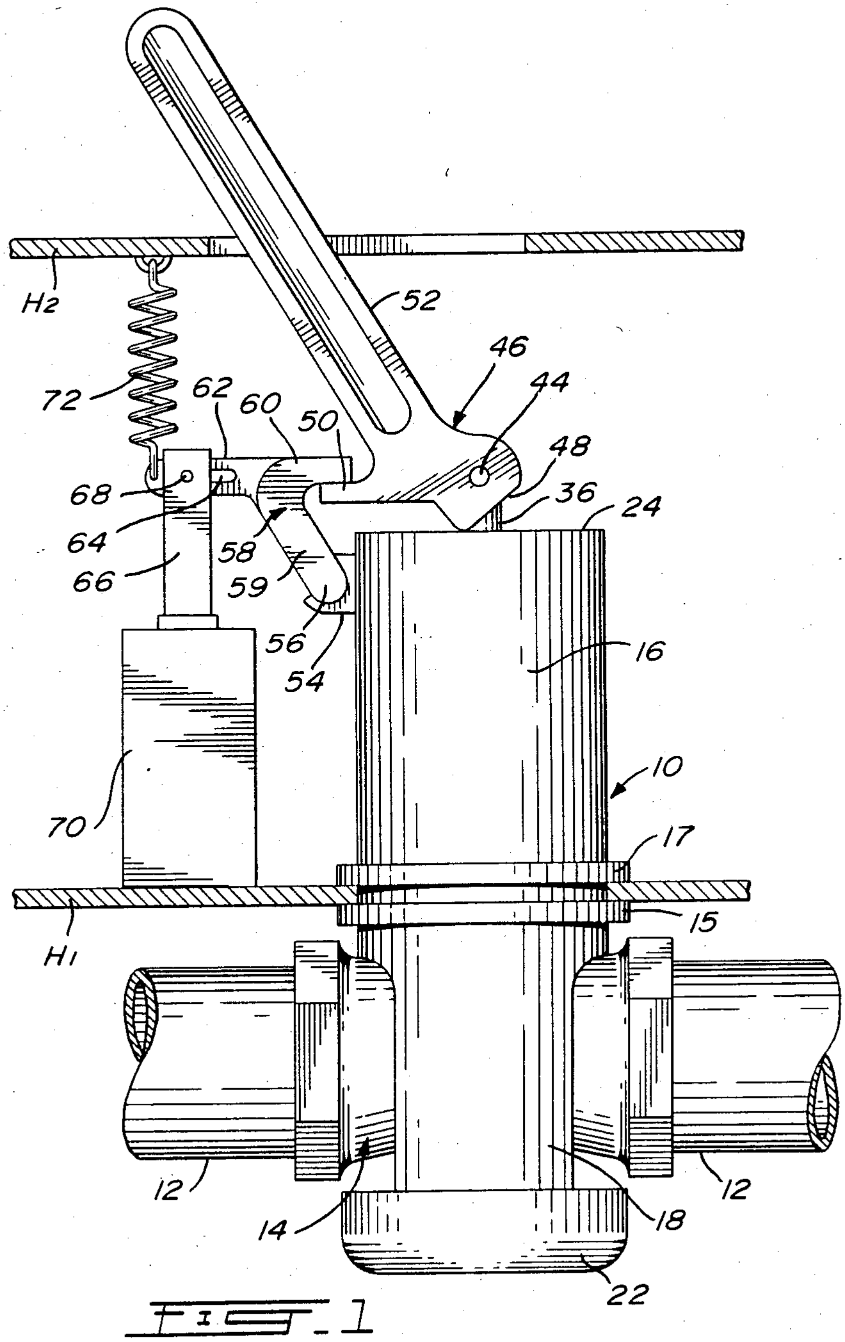
FIG. 1 is a side elevation of an automatic shut off valve in accordance with the present invention.

Referring now to the drawings, an automatic shut off valve device 10 is shown mounted on a typical valve 14 which interrupts a water line 12. The shut off valve device 10 includes a jacket 16 which is hollow and has a cylindrical upper portion and lower extending legs 18 and 20 which saddle the valve 14. A cap 22 is provided over the downwardly extending legs 18 and 20. Collars 15 and 17 are provided on the outer surface of the jacket 16 for the purpose of mounting a housing wall $H_1$. The housing is not fully shown but is represented by the walls $H_1$ and $H_2$.

The housing contains the control circuit (not shown) for activating the solenoid 70 in response to a signal from the sensors (not shown).

The valve body 14 includes a valve 26 acting against a valve seat 28 to shut the flow of water through the pipe 12. The valve 26 is connected to a valve stem 30 which extends through a collar 32 mounted on the valve body. The stem 30 also mounts a seal 34 which slides in the recess provided in the collar 32. A plunger 36 is provided in the jacket and is slidably mounted in the roof wall 24 of the jacket 16. A compressing spring 38 extends between the roof wall 24 and a collar 40 provided at the end of the plunger 36. The plunger 36 is also provided with threads adapted to threadedly engage the stem 30 of the valve 14. The stem 36 extends through the roof wall 24 and pivotally mounts a lever device 46 about pivot point 44 represented by a stub shaft.

The lever device 46 may include two identical cam heads 48 sandwiching the plunger 36 and subtending the stub shaft 44. The cam head 48 abuts on the roof wall 24 as will be further explained. The lever device 46 also mounts an arm 50 and a manual lever arm 52. A retaining device 58 is pivotally mounted in the pivot bracket 54 on the exterior wall of the jacket 16. The retaining device 58 is pivotally mounted about the stub shaft 56 which represents the pivot point. The retaining device 58 includes a first arm 59 which subtends the stub shaft 56 and a second engagement arm 60 which is adapted to engage the arm 50 of the lever device 46. The arm 60 extends at an acute angle to the arm 59 as shown in the drawings. Likewise, an acute angle is formed between the lever arm 52 and the arm 50 which extends radially from the pivot point 24.

A further arm 62 extends from the retaining device 58 in a direction opposite to the arm 60 and has a lost motion slot 64. A solenoid 70 is provided with a plunger 66 connected to the arm 62 by means of the lost motion slot 64. Finally, a spring 72 is connected to the end of the arm 62 and to the housing wall $H_2$.

Figure 2:
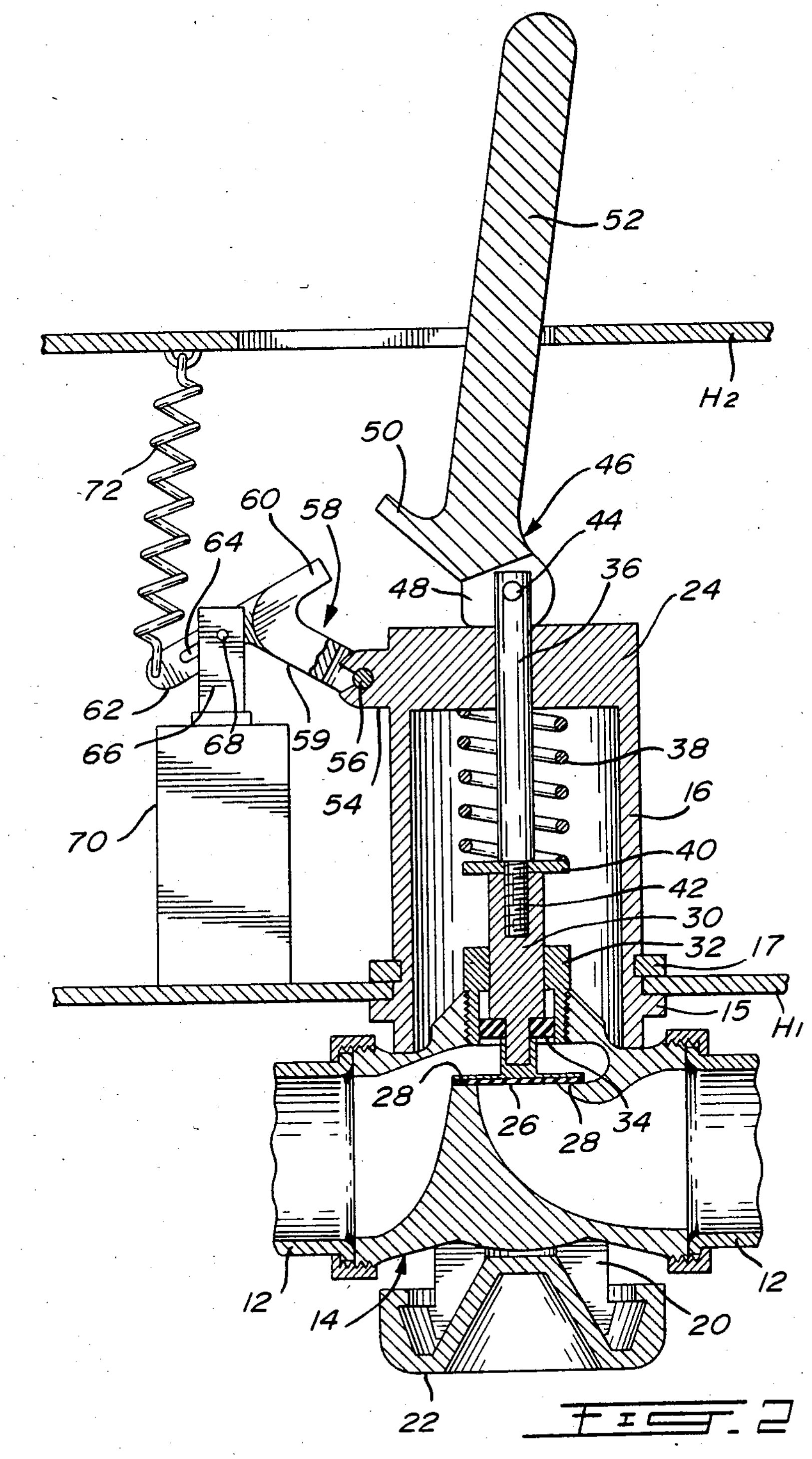
FIG. 2 is a vertical cross-section taken through the valves shown in FIG. 1 illustrated in a different operative position.

The automatic shut off valve is normally utilized in the environment of a flood control device which would include sensors communicating electronically with a control circuit activating the solenoid valve. As discussed in prior patents, U.S. Pat. Nos. 4,324,268, Jacobson, Apr. 13, 1982 and 4,305,420, Nussdorf, Dec. 15, 1981, the solenoid valve 70 would be activated when a sensor device detects floor water within the area being surveyed. Once the control circuit activates the solenoid 70, the plunger 66 will be retracted into the solenoid housing as shown in FIG. 2. When the plunger 66 is retracted from a position shown in FIG. 1, it forces the retainer device 58 to rotate counter-clockwise about the pivot point 56 thus disengaging the arm 60 from the arm 50 of the lever device 46. The lever device 46 during its retained position, that is the open valve position, is pivoted on the cam head 48 which is offset from the axis of the plunger 36 through the pivot point 44. As the retained device 58 is disengaged from the arm 50, the compression spring 38 forces the plunger 36 downwardly, thus tipping the lever device 46 about the cam head 48 into a position shown in FIG. 2. Thus, the plunger 36 forces the stem 30 downwardly so that the valve 26 closes on the valve seat 28 thereby interrupting the flow of water. In order to reset the valve in its open position, it is necessary not only for the solenoid to be reset in a position shown in FIG. 1, but also to manually crank the lever device 46 counter-clockwise so that the arm 50 engages the arm 60. This arrangement prevents an accidental resetting of the valve in the event the flood water has evaporated and as well, allows for a positive retaining of the device with positive displacement of the lever when the retained device 58 is withdrawn.

Furthermore, the valve jacket 16 in accordance with the present invention, can be mounted on most any valve. It is merely necessary to replace the threaded collar and stem of an existing valve with a collar such as collar 32 and a sliding stem. The jacket 16 is then placed over the existing valve and locked thereon by means of a cap 22.

We claim:

1. An apparatus for rendering as an automatic shut-off valve, a valve with a sliding stem projecting from a valve body, the apparatus including a jacket adapted to fit over said valve body and to contain the stem, the jacket including a portion extending axially of and containing the stem and having a roof wall normal to the axis of the stem and spaced from the end thereof, the jacket including a plunger slidably mounted to the roof wall and extending therethrough co-axial with the valve stem and adapted to be connected thereto, a compression spring extending between the roof wall and connected to the plunger within the jacket to urge the valve stem to retract within the valve body to close the valve; the plunger pivotally mounting a lever member exteriorly of the jacket, the lever member including a cam head abutting on the roof wall between a plunger extended position and a plunger retracted position, the cam head being offset from the axis of the plunger such that the stem and lever member are normally urged by the spring to a plunger retracted position within the jacket, the lever member including a first lever arm extending radially from the pivot point of the lever member and the plunger, a retaining member pivotally mounted to the exterior of the jacket and including a first member extending from the pivot point, a second arm extending therefrom at an acute angle to the first member and adapted to engage the first lever arm to retain the lever member in a plunger extended position against the urging of the compression spring, the retaining member having a third arm extending from the first member in a direction opposite to the second arm, and connected to a solenoid means whereby the retaining member may be pivoted to disengage the second arm of the retaining member from the first lever arm to allow the plunger to retract the valve stem and thus close the valve.

2. An apparatus as defined in claim 1, wherein a second lever arm extends at an acute angel relative to the first lever arm for manually resetting the valve to a valve open position.

3. An apparatus as defined in claim 1, wherein the jacket portion surrounding and containing the valve stem is cylindrical and includes jacket extendtions forming a slot adapted to saddle the valve body and a jacket cap is adapted to engage the jacket extensions on the opposite side of the valve body to lock the jacket onto the valve body.

4. An apparatus as defined in claim 1, wherein the cam heead includes a first surface at a distance from the pivot point with the plunger, said first surface being in contact with the roof wall when the lever member is in the plunger extended position and is offset from the axis of the plunger, the cam head having a second surface at a distance less than the distance of the first surface from the pivot point which is in contact with the roof wall when the lever member is in the plunger retracted position; the assembly of the lever member and the plunger spring being in mechanical equilibrium when the plunger is in the retracted position and the second surface of the cam head is in contact with the roof wall.

5. An apparatus as defined in claim 1 in which said retaining member includes a lost motion slot in said third arm connecting said retaining member to said solenoid means, and a spring connected to said third arm and normally urging said second arm onto said first lever arm when the valve is open.

* * * * *